(12) United States Patent
Takada et al.

(10) Patent No.: US 12,531,270 B2
(45) Date of Patent: Jan. 20, 2026

(54) ELECTROLYTE SOLUTION FOR NON-AQUEOUS ELECTROLYTE SECONDARY BATTERY, AND NON-AQUEOUS ELECTROLYTE SECONDARY BATTERY

(71) Applicant: Prime Planet Energy & Solutions, Inc., Tokyo (JP)

(72) Inventors: Akihiko Takada, Moriyama (JP); Keisuke Ohara, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 745 days.

(21) Appl. No.: 17/725,493

(22) Filed: Apr. 20, 2022

(65) Prior Publication Data

US 2022/0352552 A1  Nov. 3, 2022

(30) Foreign Application Priority Data

Apr. 21, 2021 (JP) ................. 2021-071559

(51) Int. Cl.
*H01M 10/0567* (2010.01)
*H01M 4/02* (2006.01)
*H01M 4/134* (2010.01)

(52) U.S. Cl.
CPC .. *H01M 10/0567* (2013.01); *H01M 2004/027* (2013.01); *H01M 4/134* (2013.01); *H01M 2300/0025* (2013.01)

(58) Field of Classification Search
USPC ....................................................... 429/347
See application file for complete search history.

(56) References Cited

U.S. PATENT DOCUMENTS

| | | |
|---|---|---|
| 2008/0044735 A1 | 2/2008 | Ryu et al. |
| 2012/0196183 A1* | 8/2012 | Chiga ............... H01M 4/62 427/58 |
| 2015/0249267 A1 | 9/2015 | Yoon et al. |
| 2018/0287140 A1 | 10/2018 | Akira et al. |
| 2020/0388837 A1 | 12/2020 | Ji et al. |
| 2021/0055657 A1 | 2/2021 | Yoshida et al. |
| 2021/0344046 A1 | 11/2021 | Matsuoka et al. |
| 2023/0070559 A1 | 3/2023 | Shibata et al. |

FOREIGN PATENT DOCUMENTS

| | | |
|---|---|---|
| CN | 101125859 A | 2/2008 |
| CN | 102623671 A | 8/2012 |
| CN | 107910591 A | 4/2018 |
| CN | 108242557 A | 7/2018 |
| CN | 112424894 A | 2/2021 |

(Continued)

OTHER PUBLICATIONS

JP,2013-20797,A JPlatPat English (Year: 2013).*
WO2018120792A1 Google Patents (Year: 2018).*

*Primary Examiner* — Mark Ruthkosky
(74) *Attorney, Agent, or Firm* — HAUPTMAN HAM, LLP

(57) ABSTRACT

The present disclosure relates to an electrolyte solution for a non-aqueous electrolyte secondary battery comprising a silane compound having two or more trialkoxysilyl groups. By the present disclosure, an electrolyte solution for a non-aqueous electrolyte secondary battery capable of inhibiting degradation of a negative electrode in the non-aqueous electrolyte secondary battery is provided.

5 Claims, 2 Drawing Sheets

(56) References Cited

FOREIGN PATENT DOCUMENTS

| CN | 112640182 A | 4/2021 | |
|---|---|---|---|
| CN | 115004438 A | 9/2022 | |
| JP | 2001-216961 A | 8/2001 | |
| JP | 2006-196338 A | 7/2006 | |
| JP | 2008-44934 A | 2/2008 | |
| JP | 2011-222450 A | 11/2011 | |
| JP | 4984022 B2 | 7/2012 | |
| JP | 2013020797 A * | 1/2013 | |
| JP | 2013-175409 A | 9/2013 | |
| JP | 2015-118871 A | 6/2015 | |
| JP | 2015-534707 A | 12/2015 | |
| JP | 2020-155253 A | 9/2020 | |
| JP | 2021-508066 A | 2/2021 | |
| WO | 2017/051500 A1 | 3/2017 | |
| WO | WO-2018120792 A1 * | 7/2018 | ........ H01M 10/0525 |
| WO | 2020/018216 A1 | 1/2020 | |
| WO | 2020054863 A1 | 3/2020 | |
| WO | 2021153395 A1 | 8/2021 | |

* cited by examiner

ELECTROLYTE SOLUTION FOR NON-AQUEOUS ELECTROLYTE SECONDARY BATTERY, AND NON-AQUEOUS ELECTROLYTE SECONDARY BATTERY

This nonprovisional application is based on Japanese Patent Application No. 2021-071559 filed on Apr. 21, 2021, with the Japan Patent Office, the entire contents of which are hereby incorporated by reference.

BACKGROUND OF THE INVENTION

Field of the Invention

The present disclosure relates to an electrolyte solution for a non-aqueous electrolyte secondary battery, and it further relates to a non-aqueous electrolyte secondary battery comprising the same.

Description of the Background Art

International Patent Publication No. WO 2017/051500 suggests forming a protective film containing a silane coupling agent on a surface of a negative electrode in a non-aqueous electrolyte secondary battery, in order to inhibit degradation of the negative electrode. Japanese Patent Laying-Open No. 2011-222450 suggests adding a particular difluorosilane compound to an electrolyte solution in a non-aqueous electrolyte secondary battery, in order to inhibit an increase of internal resistance and a degradation of a non-aqueous electrolyte solution at high temperatures.

SUMMARY OF THE INVENTION

When a protective film containing a silane-based compound is formed by surface treatment of a negative electrode as described in International Patent Publication Na WO 2017/051500, since a material containing a silane-based compound undergoes a great extent of expansion and shrinkage, the film can break during cycles, leading to a rapid degradation. Moreover, when an additive containing a silane-based compound is added to the electrolyte solution in order to protect the negative electrode side as described in Japanese Patent Laying-Open No. 2011-222450, the additive can be completely reduced and decomposed at the negative electrode and the resulting decomposition product can be broken due to expansion and shrinkage during cycles to cause a rapid degradation, or the additive remaining in the electrolyte solution can undergo oxidative decomposition at the positive electrode and consequently cannot protect the negative electrode side.

An object of the present disclosure is to provide an electrolyte solution for a non-aqueous electrolyte secondary battery, capable of inhibiting degradation of a negative electrode in the non-aqueous electrolyte secondary battery.

The present disclosure provides the following electrolyte solution for a non-aqueous electrolyte secondary battery and the following non-aqueous electrolyte secondary battery.

[1] An electrolyte solution for a non-aqueous electrolyte secondary battery, comprising a silane compound having two or more trialkoxysilyl groups.

[2] The electrolyte solution for a non-aqueous electrolyte secondary battery according to [1], wherein the trialkoxysilyl groups include one type selected from the group consisting of trimethoxysilyl group, triethoxysilyl group; and tripropoxysilyl group.

[3] The electrolyte solution for a non-aqueous electrolyte secondary battery according to [1] or [2], wherein the silane compound further has a saturated hydrocarbon group containing 2 to 6 carbon atoms.

[4] The electrolyte solution for a non-aqueous electrolyte secondary battery according to any one of [1] to [3], wherein the slime compound is represented by the following formula (1):

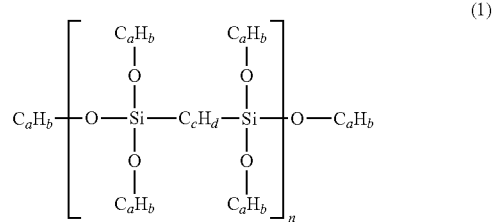

where $a=1$ to 4, $b=3$ to 7, $c=2$ to 6, $d=4$ to 12, and $n=1$ or 2.

[5] The electrolyte solution for a non-aqueous electrolyte secondary battery according to any one of [1] to [4], wherein the electrolyte solution comprises:

a compound represented by the following formula (1-1):

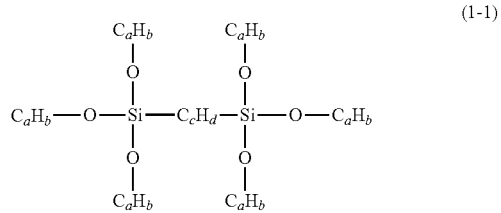

where $a=1$ to 4, $b=3$ to 7, $c=2$ to 6, and $d=4$ to 12; and
a compound represented by the following for (1-2):

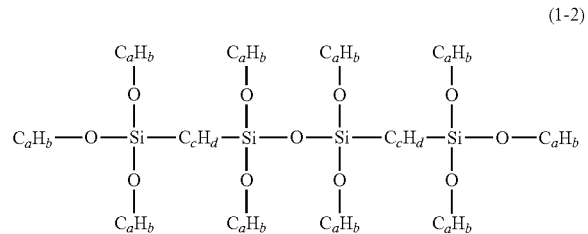

where $a=1$ to 4, $b=3$ to 7, $c=2$ to 6, and $d=4$ to 12.

[6] The electrolyte solution for a non-aqueous electrolyte secondary battery according to any one of [1] to [5], wherein the concentration of the silane compound in the electrolyte solution is from $1\times10^3$ to $1\times10^5$ ppm.

[7] A non-aqueous electrolyte secondary battery comprising:
the electrolyte solution for a non-aqueous electrolyte secondary battery according to any one of [1] to [6];
a positive electrode; and
a negative electrode.

[8] The non-aqueous electrolyte secondary battery according to [7], wherein the negative electrode includes a negative electrode active material particle containing an alloy-based negative electrode active material.

[9] The non-aqueous electrolyte secondary battery according to [8], wherein surface of the negative electrode active material particle has a structure including Si or O.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
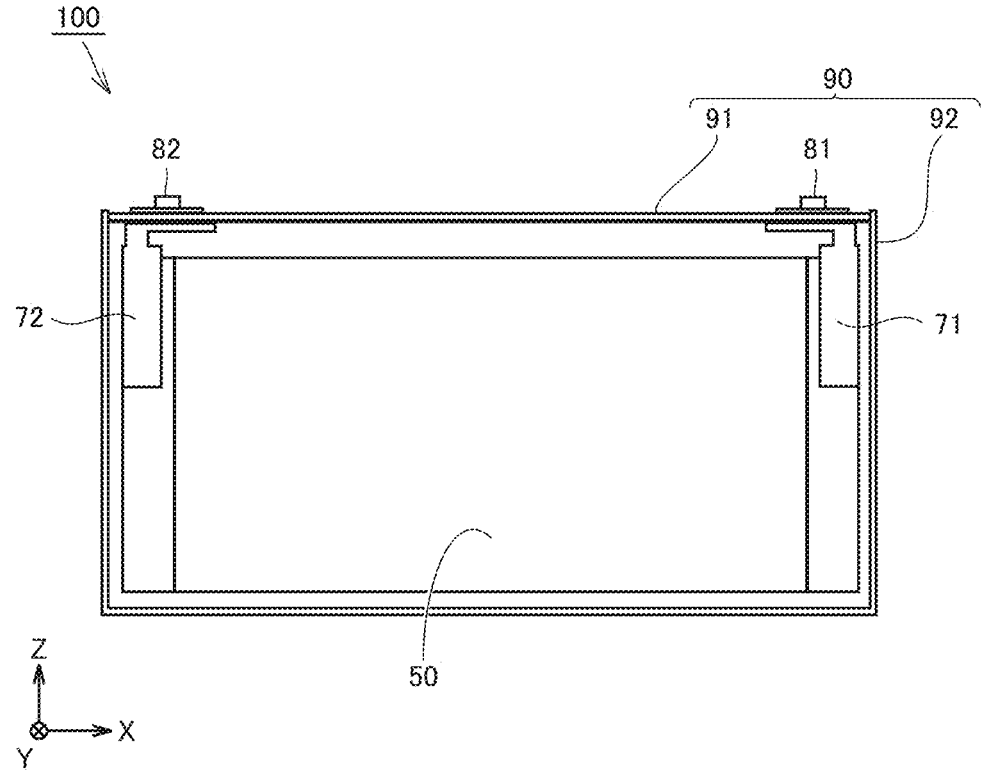
FIG. 1 is a schematic view illustrating an example of a non-aqueous electrolyte secondary battery according to the present disclosure.

Next, a description will be given of embodiments of the present invention with reference to drawings, but the below embodiments do not limit the scope of the present invention. In each drawing below, the scale has been changed as appropriate for the purpose of assisting the understanding of the components; therefore, the scale of the components in the drawings may not necessarily coincide with the actual scale of the component.

<Electrolyte Solution for Non-Aqueous Electrolyte Secondary Battery>

An electrolyte solution for a non-aqueous electrolyte secondary battery according to an aspect of the present disclosure (which may also be simply called "an electrolyte solution" hereinafter) is a liquid electrolyte. The electrolyte solution includes a silane compound. The electrolyte solution further includes a solvent and a supporting electrolyte. In addition to these components, the electrolyte solution may further include an optional additive such as a surfactant, for example.

At least part of the electrolyte solution is used to impregnate an electrode assembly, which is to be described below and provided in the non-aqueous electrolyte secondary battery. The entire amount of the electrolyte solution may be used to impregnate the electrode assembly. Part of the electrolyte solution may be used to impregnate the electrode assembly. Part of the electrolyte solution may be stored outside the electrode assembly (at the bottom of a housing, which is to be described below), for example.

[Silane Compound]

The electrolyte solution comprises a silane compound having two or more trialkoxysilyl groups. For example, the electrolyte solution may comprise two or more types, preferably two types, of silane compounds each having two or more trialkoxysilyl groups. The number of trialkoxysilyl groups comprised by each silane compound may be 2 or 4, for example, Each trialkoxysilyl group is represented by the following formula:

$$-Si(-O-C_aH_b)_3$$

where a=1 to 4, and b=3 to 7. Each trialkoxysilyl group may be for example, a trimethoxysilyl group, a triethoxysilyl group, a tripropoxysilyl group, or the like, preferably one type selected froth the group consisting of trimethoxysilyl group, triethoxysilyl group, and tripropoxysilyl group, more preferably a trimethoxysilyl group or a triethoxysilyl group.

The silane compound may further have a saturated hydrocarbon group containing 2 to 6 carbon atoms. The saturated hydrocarbon group containing 2 to 6 carbon atoms is represented by the following formula:

$$-C_cH_d-$$

where c=2 to 6, and d=4 to 12. Preferably, the saturated hydrocarbon group containing 2 to 6 carbon atoms is a saturated hydrocarbon group containing 2 or 6 carbon atoms. The saturated hydrocarbon group containing 2 to 6 carbon atoms may be either linear or branched, preferably linear.

The silane compound may be a compound represented by the above formula (1), for example. Preferably, the above formula (1) does not have a double bond.

The electrolyte solution may include either or both of a compound represented by the above formula (1-1) and a compound represented by the above formula (1-2). Preferably, neither formula (1-1) nor formula (1-2) has a double bond. In formula (1-1), the relationships of a=1 and c=2 or 6 are preferably satisfied, from the viewpoint of inhibiting degradation of a negative electrode. In formula (1-2), the relationships of a=1 and c=2 or 6 are preferably satisfied, from the viewpoint of inhibiting degradation of a negative electrode.

Preferably, the electrolyte solution includes a compound represented by the above formula (1-1) and a compound represented by the above formula (1-2), from the viewpoint of inhibiting degradation of a negative electrode.

The concentration of the silane compound in the electrolyte solution (when multiple types of silane compounds are included, this concentration refers to the total concentration of all the silane compounds) may be, for example, from 1 to $1\times10^6$ ppm, preferably more than $1.5\times10^2$ ppm and not more than $1\times10^6$ ppm, more preferably from $5.0\times10^2$ to $1\times10^5$ ppm, further preferably from $1\times10^3$ to $1\times10^5$ ppm.

When the electrolyte solution includes a compound represented by formula (1-1), the concentration of the compound represented by formula (1-1) in the electrolyte solution may be, for example, from $1\times10^2$ to $1\times10^6$ ppm, preferably from $1\times10^4$ to $1\times10^5$ ppm.

When the electrolyte solution includes a compound represented by formula (1-2) in addition to a compound represented by formula (1-1), the concentration of the compound represented by formula (1-2) in the electrolyte solution may be, for example, from 1 to $1\times10^4$ ppm, preferably from 10 to $1\times10^2$ ppm.

[Solvent]

The solvent is aprotic. The solvent may include an optional component. The solvent may include, for example, at least one selected from the group consisting of ethylene carbonate (EC), propylene carbonate (PC), butylene carbonate (BC), monofluoroetlylene carbonate (FEC), di methyl carbonate (DMC), ethyl methyl carbonate (EMC), diethyl carbonate (DEC), 1,2-dimethoxyethane (DME), methyl formate (MF), methyl acetate (MA), methyl propionate (MP), and γ-butyrolactone (GBL).

[Supporting Electrolyte]

The supporting electrolyte is dissolved in the solvent. The supporting electrolyte may include, for example, at least one selected from the croup consisting of $LiPF_6$, $LiBF_4$, and $LiN(FSO_2)_2$. The supporting electrolyte may have a molarity from 0.5 to 5.0 mol/L, for example. The supporting electrolyte may have a molarity from 0.8 to 1.4 mol/L, for example.

<Non-Aqueous Electrolyte Secondary Battery>

A non-aqueous electrolyte secondary battery according to another aspect of the present disclosure (which may also be simply called "a battery" hereinafter) includes an electrolyte solution for a non-aqueous electrolyte secondary battery, a positive electrode, and a negative electrode. To this electrolyte solution for a non-aqueous electrolyte secondary battery, the above description provided for the electrolyte solution also applies. The positive electrode and the negative electrode will be described later.

A description will be given of the battery, referring to FIG. 1. A battery 100 illustrated in FIG. 1 may be used for any purpose of use. Battery 100 may be used as a main electric power supply or a motive force assisting electric power supply in an electric vehicle, for example. A plurality of batteries 100 may be connected together to form a battery module or a battery pack.

Battery 100 has a predetermined rated capacity. Battery 100 may have a rated capacity from 1 to 300 Ah, for example; it may have a rated capacity from 1 to 50 Ah, for example; it may have a rated capacity from 2 to 25 Ah, for example; it may have a rated capacity from 3 to 5 Ah, for example; and it may have a rated capacity from 4 to 4.2 Ah, for example.

Battery 100 includes a housing 90. Housing 90 is prismatic (a flat, rectangular parallelepiped). However, prismatic is merely an example. Housing 90 may have any configuration. Housing 90 may be cylindrical, or may be a pouch, for example. Housing 90 may be made of Al (aluminum) alloy, for example. Housing 90 accommodates an electrode assembly 50 and an electrolyte solution (not illustrated). Housing 90 may include a sealing plate 91 and an exterior can 92, for example. Sealing plate 91 closes an opening of exterior can 92. Sealing plate 91 and exterior can 92 may be bonded together by laser beam welding, for example.

Sealing plate 91 is provided with a positive electrode terminal 81 and a negative electrode terminal 82. Sealing plate 91 may further be provided with an inlet and gas-discharge valve. Through the inlet, the electrolyte solution may be injected into housing 90. Electrode assembly 50 is connected to positive electrode terminal 81 via a positive electrode current-collecting member 71. Positive electrode current-collecting member 71 may be an Al plate and/or the like, for example. Electrode assembly 50 is connected to negative electrode terminal 82 via a negative electrode current-collecting member 72. Negative electrode current-collecting member 72 may be a Cu (copper) plate and/or the like, for example.

Figure 2:
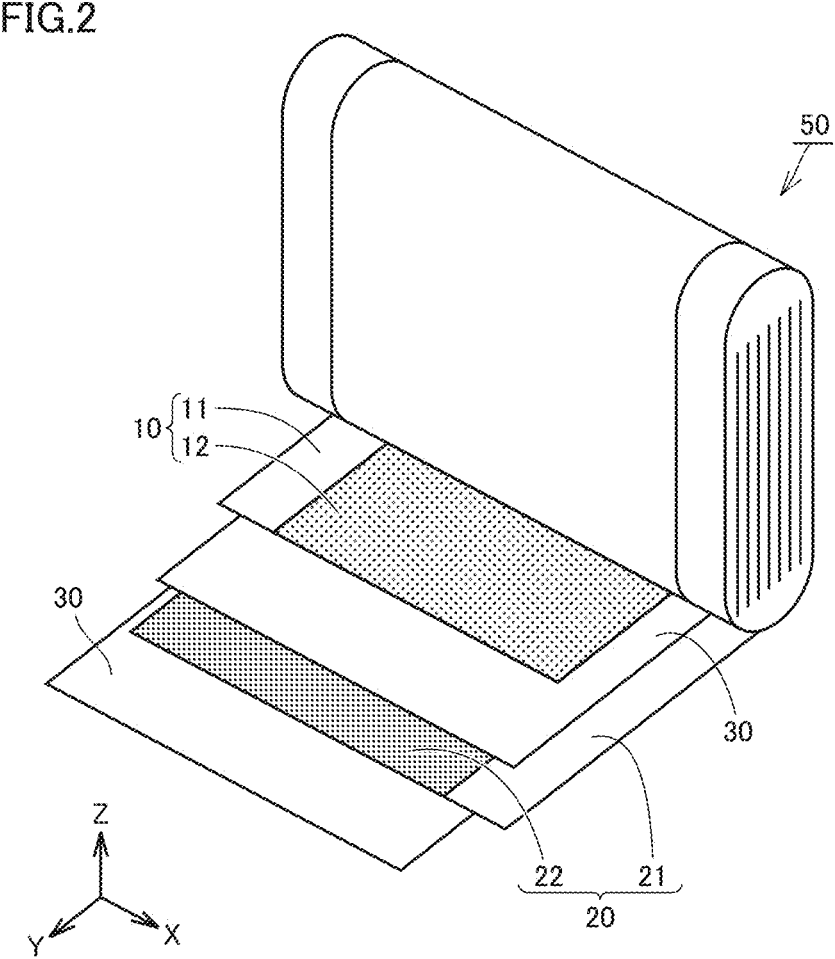
FIG. 2 is a schematic view illustrating an example of an electrode assembly according to the present embodiment.

FIG. 2 is a schematic view illustrating an example of an electrode assembly according to the present embodiment.

Electrode assembly 50 is a wound-type one. Electrode assembly 50 includes positive electrode 10, a separator 30, and a negative electrode 20. In other words, battery 100 includes positive electrode 10, negative electrode 20, and the electrolyte solution. Each of positive electrode 10, separator 30, and negative electrode 20 is a belt-shaped sheet. Electrode assembly 50 may include a plurality of separators 30. Electrode assembly 50 is formed by stacking positive electrode 10, separator 30, and negative electrode 20 in this order, and then winding them spirally. Positive electrode 10 or negative electrode 20 may be interposed between separators 30. Each of positive electrode 10 and negative electrode 20 may be interposed between separators 30. After the winding, electrode assembly 50 is shaped into a flat form. The wound-type is merely an example. Electrode assembly 50 may be a stack-type one, for example.

[Positive Electrode]

Positive electrode 10 may include a positive electrode substrate 11 and a positive electrode active material layer 12, for example. Positive electrode substrate 11 is a conductive sheet. Positive electrode substrate 11 may be an Al alloy foil and/or the like, for example. The "thickness" of each member herein may be measured with a constant-pressure thickness-measuring instrument (a thickness gauge). Positive electrode substrate 11 may have a thickness from 10 to 30 μm, for example. Positive electrode active material layer 12 may be placed on a surface of positive electrode substrate 11. For example, positive electrode active material layer 12 may be placed on only one side of positive electrode substrate 11. For example, positive electrode active material layer 12 may be placed on both sides of positive electrode substrate 11. At one end of positive electrode 10 in a width direction (in the X-axis direction in FIG. 2), positive electrode substrate 11 may be exposed. To the exposed portion of positive electrode substrate 11, positive electrode current-collecting member 71 may be bonded.

Positive electrode active material layer 12 may have a thickness from 10 to 200 μm, for example. Positive electrode active material layer 12 includes positive electrode active material particles. That is, positive electrode 10 includes positive electrode active material particles. The positive electrode active material particles may include an optional component. The positive electrode active material particles may include, for example, at least one selected from the group consisting of $LiCoO_2$, $LiNiO_2$, $LiMnO_2$, $LiMn_2O_4$, $Li(NiCoMn)O_2$, $Li(NiCoAl)O_2$, and $LiFePO_4$. Here, the expression "(NiCoMn)" in the composition formula "Li(NiCoMn)$O_2$", for example, means that the constituents within the parentheses are regarded as collectively taking up one fraction in the entire composition ratio. In addition to the positive electrode active material particles, positive electrode active material layer 12 may further include a conductive material, a binder, and the like. The conductive material may include an optional component. The conductive material may include acetylene black and/or the like, for example. The amount of the conductive material to be used may be, for example, from 0.1 parts by mass to 10 parts by mass relative to 100 parts by mass of the positive electrode active material particles. The binder may include an optional component. The binder may include polyvinylidene difluoride (PVdF) and/or the like, for example. The amount of the binder to be used may be, for example, from 0.1 parts by mass to 10 parts by mass relative to 100 parts by mass of the positive electrode active material particles.

The positive electrode active material particles may have a D50 from 1 to 30 μm, for example. The "D50" herein refers to a particle size in volume-based particle size distribution at which the cumulative particle volume (accumulated from the small particle size side) reaches 50% of the total particle volume. The volume-based particle size distribution may be obtained by measurement with a laser-diffraction particle size distribution analyzer.

The positive electrode active material particles may have a BET specific surface area from 0.1 to 10 $m^2/g$, for example. The "BET specific surface area" herein refers to a specific surface area; calculated by a BET multi-point method, in an absorption isotherm obtained through measurement by a gas adsorption method. The adsorbate gas is nitrogen gas. For each measurement target, the BET specific surface area is measured three tithes or more. The arithmetic mean of the three or more measurements is regarded as the BET specific surface area of the measurement target.

[Negative Electrode]

Negative electrode 20 may include a negative electrode substrate 21 and a negative electrode active material layer 22, for example. Negative electrode substrate 21 is a conductive sheet. Negative electrode substrate 21 may be a Cu (copper) alloy foil and/or the like, for example. Negative electrode substrate 21 may have a thickness from 5 to 30 μm, for example. Negative electrode active material layer 22 may be placed on a surface of negative electrode substrate 21. For example, negative electrode active material layer 22 may be placed on only one side of negative electrode substrate 21. For example, negative electrode active material layer 22 may be placed on both sides of negative electrode substrate 21. At one end of negative electrode 20 in a width direction (in the X-axis direction in FIG. 2) negative electrode substrate 21 may be exposed. To the exposed portion of negative electrode substrate 21, negative electrode current-collecting member 72 may be bonded.

Negative electrode active material layer 22 may have a thickness from 10 to 200 μm, for example. Negative electrode active material layer 22 includes negative electrode active material particles. That is, negative electrode 20 includes negative electrode active material particles. The negative electrode active material particles may include an optional component. The negative electrode active material particles may be powder, for example. The negative electrode active material particles may have a D50 from 1 to 30 μm, for example. The "D50" herein refers to a particle size in volume-based particle size distribution at which the cumulative particle volume (accumulated from the small particle size side) reaches 50% of the total panicle volume. D50 may be measured with a laser-diffraction particle size distribution analyzer. The negative electrode active material particles may have a BET specific surface area from 0.1 to 10 m²/g, for example.

Negative electrode active material layer may include the negative electrode active material particles in a mass fraction from 80 to 99%, for example. Negative electrode active material layer 22 may include the negative electrode active material particles in a mass fraction from 95 to 98%, for example.

The negative electrode active material particles may contain an alloy-based negative electrode active material, for example. The negative electrode active material may consist essentially of an alloy-based negative electrode active material, for example. The alloy-based negative electrode active material may have a high specific capacity. When the alloy-based negative electrode active material is used, energy density is expected to be enhanced. However, an alloy-based negative electrode active material tends to undergo a great extent of volume change (namely, tends to have a high expansion-shrinkage rate) during charge and discharge. Because of this, when a protective film is formed on a surface of a negative electrode that includes an alloy-based negative electrode active material, the protective film may break due to the volume change during charge and discharge to become incapable of inhibiting degradation of the negative electrode. On the other hand, in a battery according to the present disclosure, even when the negative electrode includes an alloy-based negative electrode active material which tends to undergo a great extent of volume change (namely, tends to have a high expansion-shrinkage rate) during charge and discharge, degradation of the negative electrode may be sufficiently inhibited because the above-described electrolyte solution is used.

[Alloy-Based Negative Electrode Active Material]

The alloy-based negative electrode active material is capable of occluding Li (lithium) via alloying reaction and releasing Li via dealloying reaction. The alloy-based negative electrode active material may include, for example, at least one selected from the group consisting of Si (silicon), Sn (tin), Al (aluminum), Cd (cadmium), Sb (antimony), and Pb (lead). Si is a material that holds great promise. Various Si-containing materials may function as the negative electrode active material. In other words, the negative electrode active material may include a Si-containing material.

The "Si-containing material" herein refers to a material that contains Si. As long as it contains Si, the Si-containing material may further contain an additional component. The Si-containing material May consist essentially of Si metal (the elemental Si). The Si-containing material may include a Si-based alloy, for example. The Si-containing material may include; for example, at least one selected from the group consisting of SiCu alloy, SiNi alloy, SiAl alloy, and SiLn alloy. The Si-Containing material may include a Si compound, for example. The Si-containing material may include a Si oxide, for example. The Si-containing material may include $SiO_x$ ($0.5 \leq x \leq 1.5$), for example. The Si-containing material may include a composite material of Si and other materials, for example. The Si-containing material may include a Si/C composite material, for example. The Si/C composite material may be a carbon material (such as graphite and/or amorphous carbon) carrying Si metal, Si oxide, and/or the like, for example. The Si-containing material may, include, for example, at least one selected from the group consisting of Si metal, Si-based alloy Si Oxide, and Si/C composite material.

[Carbon-Based Negative Electrode Active Material]

The negative electrode active material particles may include a carbon-based negative electrode active material, for example. The negative electrode active material particles may consist essentially of a carbon-based negative electrode active material, for example. The carbon based negative electrode active material may include, for example, at least one selected from the group consisting of graphite, soft carbon, and hard carbon.

The negative electrode active material particles may include both the alloy-based negative electrode active material and the carbon-based negative electrode active material, for example. The carbon-based negative electrode active material tends to be superior to the alloy-based negative electrode active material in cycle performance, for example. When the negative electrode active material particles include both the alloy-based negative electrode active material and the carbon-based negative electrode active material, a good balance between energy density and cycle performance is expected to be achieved, for example. The mass ratio of the alloy-based negative electrode active material and the carbon-based negative electrode active material may be "(alloy-based negative electrode active material)/(carbon-based negative electrode active material)=1/99 to 99/1", or may be "(alloy-based negative electrode active material)/(carbon-based negative electrode active material)=1/99 to 30/70", or may be "(alloy-based negative electrode active material)/(carbon-based negative electrode active material) 1/99 to 10/90", for example.

The negative electrode active material particles may include, for example, at least one selected from the group consisting of graphite, soft carbon, hard carbon, SiO, and metal Si. The negative electrode active material particles may consist essentially of spheroidized graphite particles, for example. The spheroidized graphite particles may be covered with a pitch-based carbon material and/or the like, for example.

Negative electrode active material layer 22 may further include a conductive material, a binder, and the like, in addition to the negative electrode active material particles. The conductive material may include an optional component. The conductive material may include carbon nanotubes, carbon black, and/or the like, for example, The amount of the conductive material to be used may be, for example, from 0.1 to 10 parts by mass relative to 100 parts by mass of the negative electrode active material particles. The binder may include an optional component. The binder may include, for example, at least one selected from the group consisting of carboxymethylcellulose (CMC) and styrene-butadiene rubber (SBR). The amount of the binder to be used may be, for example, from 0.1 to 10 parts by mass relative to 100 parts by mass of the negative electrode active material particles.

Preferably, the surface of the negative electrode active material particle has at least one structure selected from the group consisting of a structure represented by —$R_1$—Si—OH ($R_1$ includes Si or O), —$R_2$Si(—O—)$_3$ structure ($R_2$ represents a saturated hydrocarbon group containing 2 to 6 carbon atoms), and a structure represented by the following formula (2):

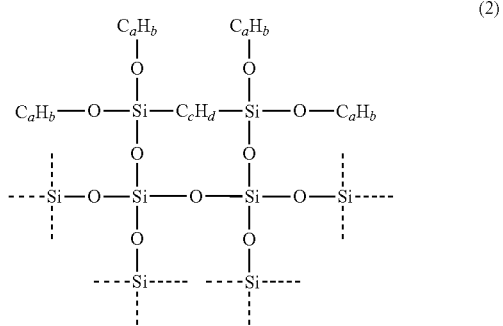

(2)

where a=1 to 4, b=3 to 7, c=2 to 6, and d=4 to 12.

[Separator]

At least part of separator 30 is interposed between positive electrode 10 and negative electrode 20. Separator 30 separates positive electrode 10 from negative electrode 20. Separator 30 may have a thickness from 10 μm to 30 μm, for example. Separator 30 is porous. Separator 30 allows for permeation of the electrolyte solution therethrough. Separator 30 may have an air permeability from 200 s/100 mL to 400 s/100 mL, for example. The "air permeability" herein refers to the "air resistance" defined by "JIS P8117:2009". The air permeability is measured by a Gurley test method.

Separator 30 is electrically insulating. Separator 30 may include a polyolefin-based resin, for example. Separator 30 may consist essentially of a polyolefin-based resin, for example. The polyolefin-based resin may include, for example, at least one selected from the group consisting of polyethylene (PE) and polypropylene (PP). Separator 30 may have a monolayer structure, for example. Separator 30 may consist essentially of a PE layer, for example. Separator 30 may have a multilayer structure, for example. Separator 30 may be formed by stacking a PP layer, a PE layer, and a PP layer in this order, for example. On a surface of separator 30, a heat-resistant layer and/or the like may be formed, for example.

EXAMPLES

Next, examples according to the present disclosure (also called "the present example" herein) will be described. It should be noted that the below description does not limit the scope of the present disclosure. "%" and "part(s)" in the examples refer to mass % and part(s) by mass, respectively, unless otherwise specified.

<Producing Non-Aqueous Electrolyte Secondary Battery>

In the manner described below, batteries for evaluation purpose, or evaluation batteries, No. 1 to No. 25 (non-aqueous electrolyte secondary batteries) were produced.

(Preparing Positive Electrode)

The below materials were prepared.

Positive electrode active material: Li(NiCoMn)$O_2$
Conductive material: Acetylene black
Binder: PVdF
Dispersion medium: N-methyl-2-pyrrolidone
Positive electrode substrate: Al foil The positive electrode active material the conductive material, the binder, and the dispersion medium were mixed to prepare a positive electrode composite material slurry. The solid matter ratio (in mass) was "(positive electrode active material)/(conductive material)/(binder)=87/10/3". The positive electrode composite material slurry was applied to a surface of the positive electrode substrate to form a positive electrode composite material layer. The positive electrode composite material layer was compressed. In this way, a positive electrode was prepared.

(Preparing Negative Electrode)

The below materials were prepared.

Alloy-based negative electrode active material: $SiO_x$ (D50=15 μm, x=0 to 2)
Carbon-based negative electrode active material: Graphite (D50=20 μm)
Binder: CMC SBR
Dispersion medium: Water
Negative electrode substrate: Cu foil
First additive: As specified in Table 1.
Second additive: As specified in Table 1.

The alloy-based negative electrode active material and the carbon-based negative electrode active material were mixed in a predetermined mass ratio to prepare a negative electrode active material (mix powder).

The negative electrode active material, the binder, the dispersion medium, and, optionally, the first additive and the second additive were mixed to prepare a negative electrode slurry. The negative electrode slurry was applied to a surface of the negative electrode substrate, followed by drying, and thereby a negative electrode active material layer was formed. The negative electrode active material layer was compressed to produce a negative electrode raw sheet. The negative electrode raw sheet was cut into a predetermined size to prepare a negative electrode (Electrolyte Solution)

An electrolyte solution was prepared. The electrolyte solution included the below components The types, amounts added, and mass fractions of a first additive and a second additive in the electrolyte solution are specified in Table 1 below. The amount added represents the composition in the electrolyte solution before injection into the battery, and the mass fraction in the electrolyte solution represents the content after activation treatment.

Solvent: "FEC/EMC=3/7 (volume ratio)"
Supporting electrolyte: $LiPF_6$ (molarity=1.0 mol/L)
First additive: As specified in Table 1.
Second additive: As specified in Table 1.

Each of silane compounds 1A to 1D shown n Table 1 has a structure represented by the above formula (1-1), where a, b, c, and d represent the numbers as specified below.

Silane compound 1A: (a, b, c, d)=(1, 3, 2, 4)
Silane compound 1B: (a, b, c, d)=(1, 3, 6, 12)

Silane compound 1C: (a, b, c, d)=(2, 5, 2, 4)
Silane compound 1D: (a, b, c, d)=(2, 5, 6, 12)
Each of silane compounds 2A to 2D shown in Table 1 has a structure represented by the above formula (1-2), where a, b, c, and d represent the numbers as specified below.
Silane compound 2A: (a, b, c, d)=(1, 3, 2, 4)
Silane compound 2B: (a, b, c, d)=(1, 3, 6, 12)
Silane compound 2C: (a, b, c, d)=(2, 5, 2, 4)
Silane compound 2D: (a, b, c, d)=(2, 5, 6, 12)
Each of additives 1 to 4 shown in Table 1 is the following compound and compound mixture.
Additive 1: Trimethoxysilylpropylaniline
Additive 2: Trialkoxyvinylsilane
Additive 3: Triethylsilanol [also called hydroxytrimethylsilane or triethyl(hydroxy)silane]
Additive 4: Ethylenedioxybis(trimethylsilane) [also called 1,2-bis(trimethylsilyloxy)ethane or ethyleneglycolbis(trimethylsiylether)]

The solvent, the supporting electrolyte, and, optionally, the first additive and the second additive were mixed in a predetermined mass ratio to prepare an electrolyte solution.

(Assembly)

A separator was prepared. The separator had a three-layer structure. The three-layer structure consisted of a PP layer, a PE layer, and a PP layer. The separator had an air permeability of 200 s/100 mL.

The positive electrode, the separator, and the negative electrode were stacked so that the positive electrode faced the negative electrode with the separator interposed therebetween. In this way, an electrode assembly was formed. A housing was prepared. The housing was a pouch made of an Al-laminated film. The electrode assembly was placed in the housing. Into the housing, the electrolyte solution was injected. The housing was hermetically sealed. In this way, an evaluation battery was assembled.

(Activation Treatment)

In a thermostatic chamber set at 25° C., by charging in a constant-current mode at 0.3 C, the evaluation battery was charged to 4.2 V. Then, by discharging in a constant-current mode at 0.3 C, the evaluation battery was discharged to 3 V. This sequence of charging and discharging was repeated three times. "C" is a symbol representing an electric current hour rate. With an electric current of 1 C, the design capacity of an evaluation battery is discharged in one hour.

(Measurement of Initial Capacity)

After the activation treatment, the evaluation battery was charged in a constant current-constant voltage mode to its full capacity. The electric current of the constant-current charging was 0.3 C. The voltage of the constant-voltage charging was 4.2 V. The constant-voltage charging was terminated when the electric current attenuated to reach 0.05 C. Then, by discharging in a constant-current mode at 0.3 C, the evaluation battery was discharged to 3.0 V, and thereby the initial capacity (discharged capacity) was measured.

<Evaluation>

(Initial Direct-Current Resistance)

The voltage of the evaluation battery was adjusted to 3.7 V. In a thermostatic chamber set at 25° C., the evaluation battery was discharged at a current of 0.5 C for 30 seconds. The amount of voltage drop over the course of 10 seconds from the start of discharging was measured. From the amount of voltage drop and the discharge current, the direct-current resistance was calculated.

(Post-Degradation Capacity Retention and Post-Degradation Resistance Increment)

In a thermostatic chamber set at 25° C., 1000 cycles of charging and discharging were carried out. A single cycle consisted of a single sequence of "Charge→First rest→Discharge→Second rest" as specified below. Under the same conditions as for the measurement of initial capacity, the discharged capacity of the 1st cycle and that of the 1000th cycle were measured. Moreover, in the same manner as for the measurement of initial direct-current resistance, the direct-current resistance of the 1st cycle and that of the 1000th cycle were measured. The discharged capacity of the 1000th cycle was divided by the discharged capacity of the 1st cycle to obtain the post-degradation capacity retention. The direct-current resistance of the 1000th cycle was divided by the direct-current resistance of theist cycle to obtain the post-degradation resistance increment. Results are shown in Table 1.

Charge: Constant-current mode, Current=0.3 It, Cut-off voltage=4.2 V
First rest: 10 minutes
Discharge: Constant-current mode, Current=0.3 It, Cut-off voltage=3.0 V
Second rest: 10 minutes
Second rest: 10 minutes

TABLE 1

| No. | First additive | Amount added (relative to electrolyte solution) [ppm] | Second additive | Amount added (relative to electrolyte solution) [ppm] | Added to: | Content in electrolyte solution [ppm] (First additive) | Content in electrolyte solution [ppm] (Second additive) | Post-degradation capacity retention [%] | Post-degradation resistance increment [%] |
|---|---|---|---|---|---|---|---|---|---|
| 1 | Silane compound 1A | $5 \times 10^4$ | Silane compound 2A | 150 | Electrolyte solution | $3.3 \times 10^4$ | 73 | 88 | 9 |
| 2 | Silane compound 1B | $5 \times 10^4$ | Silane compound 2B | 150 | Electrolyte solution | $4.2 \times 10^4$ | 70 | 82 | 16 |
| 3 | Silane compound 1C | $5 \times 10^4$ | Silane compound 2C | 150 | Electrolyte solution | $3.7 \times 10^4$ | 81 | 85 | 13 |
| 4 | Silane compound 1D | $5 \times 10^4$ | Silane compound 2D | 150 | Electrolyte solution | $4.0 \times 10^4$ | 70 | 80 | 21 |
| 5 | Silane compound 1A | $5 \times 10^4$ | — | — | Electrolyte solution | $3.3 \times 10^4$ | — | 70 | 18 |
| 6 | Silane compound 1B | $5 \times 10^4$ | — | — | Electrolyte solution | $4.2 \times 10^4$ | — | 78 | 20 |
| 7 | Silane compound 1C | $5 \times 10^4$ | — | — | Electrolyte solution | $3.7 \times 10^4$ | — | 76 | 25 |
| 8 | Silane compound 1D | $5 \times 10^4$ | — | — | Electrolyte solution | $4.0 \times 10^4$ | — | 77 | 24 |
| 9 | — | — | — | — | — | — | — | 31 | 50 |
| 10 | Silane compound 1B | $5 \times 10^4$ | Silane compound 2B | 150 | Negative electrode | 42 | <10 | 40 | 45 |
| 11 | Silane compound 1A | $5 \times 10^4$ | Silane compound 2A | 150 | Negative electrode | 33 | <10 | 35 | 47 |
| 12 | Silane compound 1C | $5 \times 10^4$ | Silane compound 2C | 150 | Negative electrode | 37 | <10 | 37 | 51 |
| 13 | Silane compound 1D | $5 \times 10^4$ | Silane compound 2D | 150 | Negative electrode | 46 | <10 | 25 | 43 |

TABLE 1-continued

| No. | First additive | Amount added (relative to electrolyte solution) [ppm] | Second additive | Amount added (relative to electrolyte solution) [ppm] | Added to: | Content in electrolyte solution [ppm] (First additive) | Content in electrolyte solution [ppm] (Second additive) | Post-degradation capacity retention [%] | Post-degradation resistance increment [%] |
|---|---|---|---|---|---|---|---|---|---|
| 14 | — | — | Silane compound 2A | 150 | Electrolyte solution | — | 54 | 42 | 90 |
| 15 | — | — | Silane compound 2B | 150 | Electrolyte solution | — | 60 | 32 | 88 |
| 16 | — | — | Silane compound 2C | 150 | Electrolyte solution | — | 76 | 35 | 67 |
| 17 | — | — | Silane compound 2D | 150 | Electrolyte solution | — | 88 | 39 | 76 |
| 18 | Additive 1 | $5 \times 10^4$ | — | — | Electrolyte solution | $2.1 \times 10^4$ | — | 35 | 55 |
| 19 | Additive 2 | $5 \times 10^4$ | — | — | Electrolyte solution | $3.3 \times 10^4$ | — | 33 | 52 |
| 20 | Additive 3 | $5 \times 10^4$ | — | — | Electrolyte solution | $1.9 \times 10^4$ | — | 33 | 52 |
| 21 | Additive 4 | $5 \times 10^4$ | — | — | Electrolyte solution | $2.7 \times 10^4$ | — | 33 | 52 |
| 22 | Additive 1 | $5 \times 10^4$ | — | — | Negative electrode | 66 | — | 37 | 79 |
| 23 | Additive 2 | $5 \times 10^4$ | — | — | Negative electrode | 33 | — | 39 | 88 |
| 24 | Additive 3 | $5 \times 10^4$ | — | — | Negative electrode | 28 | — | 42 | 65 |
| 25 | Additive 4 | $5 \times 10^4$ | — | — | Negative electrode | 43 | — | 36 | 82 |

Referring to Table 1, each of the evaluation batteries Nos. 1 to 8 maintained a high capacity retention after degradation, accompanied by a small resistance increment.

<Additional Statement>

The present specification also discloses "a method of producing a non-aqueous electrolyte secondary battery"

The method of producing a non-aqueous electrolyte secondary battery according to the present disclosure includes (a) to (c) below.

(a) Mixing a silane compound, a solvent, and a supporting electrolyte to prepare an electrolyte solution.

(b) Forming an electrode assembly that includes a negative electrode and a positive electrode.

(c) Impregnating the electrode assembly in the electrolyte solution to produce a battery.

The silane compound has two or more trialkoxysilyl groups.

The present embodiment and the present example are illustrative in any respect. The present embodiment and the present example are non-restrictive. The scope of the present disclosure encompasses any modifications within the meaning and the scope equivalent to the terms of the claims. For example, it is expected that certain configurations of the present embodiments and the present examples can be optionally combined. When a plurality of functions and effects are described in the present embodiment and the present example, the scope of the present disclosure is not limited to the scope where all these functions and effects are obtained.

Although the embodiments of the present invention have been described, the embodiments disclosed herein are illustrative and non-restrictive in any respect. The scope of the present invention is defined by the terms of the claims, and is intended to encompass any modifications within the meaning and the scope equivalent to the terms of the claims.

What is claimed is:

1. An electrolyte solution for a non-aqueous electrolyte secondary battery, comprising a silane compound having two or more trialkoxysilyl groups, wherein the electrolyte solution comprises:

a compound represented by the following formula (1-1):

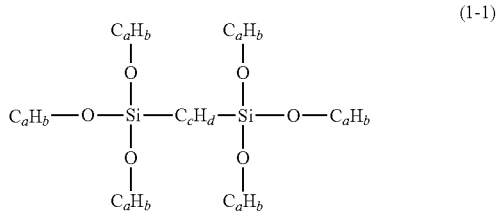

(1-1)

where a=1 to 4, b=3 to 7, c=2 to 6, and d=4 to 12; and a compound represented by the following formula (1-2):

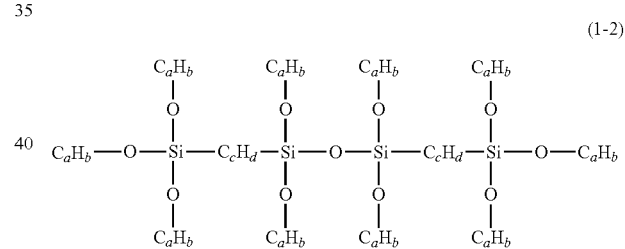

(1-2)

where a=1 to 4, b=3 to 7, c=2 to 6, and d=4 to 12.

2. The electrolyte solution for a non-aqueous electrolyte secondary battery according to claim 1, wherein the concentration of the silane compound in the electrolyte solution is from $1 \times 10^3$ to $1 \times 10^5$ ppm.

3. A non-aqueous electrolyte secondary battery comprising:
the electrolyte solution for a non-aqueous electrolyte secondary battery according to claim 1;
a positive electrode; and
a negative electrode.

4. The non-aqueous electrolyte secondary battery according to claim 3, wherein the negative electrode includes a negative electrode active material particle containing at least one selected from the group consisting of Si (silicon), Sn (tin), Al (aluminum), Cd (cadmium), Sb (antimony), and Pb (lead).

5. The non-aqueous electrolyte secondary battery according to claim 4, wherein a surface of the negative electrode active material particle has a structure including Si or O.

* * * * *